UNITED STATES PATENT OFFICE.

JOHN T. WARING, OF YONKERS, NEW YORK.

IMPROVEMENT IN DYEING FELT HATS AND CAPS.

Specification forming part of Letters Patent No. 142,064, dated August 19, 1873; application filed March 15, 1873.

*To all whom it may concern:*

Be it known that I, JOHN T. WARING, of Yonkers, in the county of Westchester and State of New York, have invented an Improvement in Dyeing Felt Hats and Caps, of which the following is a specification:

The difficulty heretofore experienced in the production of felt hats or caps in which pure wool has been mixed with "shoddy" or other material containing more or less of cotton or other vegetable substance, has been the failure of the vegetable substances in them to dye in like manner and in common with the wool, as the whole is dyed together in the made article, thus giving a speckled appearance to the hat or cap, so that what has been gained by using more or less of shoddy or other cheap material containing vegetable substances has been in a measure lost by the inferior appearance of the hat. My invention consists in treating the hat or cap body made, as described, of mixed materials in which are vegetable substances, or of wool, which itself contains burs or other vegetable matters, in a bath of sulphuric or other acid solution, to kill the cotton or vegetable fiber, and afterward neutralizing or soaking or washing out the acid, such process to be performed after the body has been formed and "hardened," or at any stage in the process of felting, or between any two of the felting stages, or after the felting is completed, but before dyeing. By this treatment of the hat-body I am enabled to produce a cheap hat of a regular color or uniform dye on its surface.

From actual experiment I find that a bath of sulphuric-acid solution of a strength of from six to twelve degrees, more or less, of the Baumé hydrometer will answer, exposing the hat or cap body therein for a period of from six to eight hours, more or less. The body should then be dried, with the acid in it, at a temperature of about 120° Fahrenheit, more or less, and subsequently the acid be neutralized by alkalies, or be soaked or washed out with water, but netralizing by an alkali expedites the process. After this the body is dyed, and should any surface-dust remain, consequent on the killing of the vegetable substances, it is removed by the usual operations of pouncing and finishing the hat-body, so that nothing remains on the surface of the latter but wool.

This process differs from others in which vegetable fibers have been treated with acids preparatory to being made into felted goods with fur or other animal fiber in the treatment being performed after the animal and vegetable fiber have been formed together and after the felting has been commenced.

Although my experiments in and practice of this invention have been directed to the manufacture of what are known as wool hats, the invention is not necessarily confined to wool hats, but may be equally applicable to hats in which shoddy or other materials containing vegetable fiber may be mixed with fur.

What is here claimed, and desired to be secured by Letters Patent, is—

The process, substantially as herein described, of treating the hat or cap body after the same has been formed and before dyeing at any stage in the process of felting, or between any two stages thereof, or after the felting is completed, by exposing the same to an acid solution, and afterward removing the acid from said body, for the purpose or purposes herein set forth.

JOHN T. WARING.

Witnesses:
HENRY T. BROWN,
FRED. HAYNES.